(12) United States Patent
Jimi et al.

(10) Patent No.: US 7,221,923 B2
(45) Date of Patent: May 22, 2007

(54) RECEIVING APPARATUS

(75) Inventors: Kuniko Jimi, Tokyo (JP); Kenichi Urayama, Kanagawa (JP); Seijiro Ishizuka, Tokyo (JP)

(73) Assignee: Sony Corporation, Tokyo (JP)

( * ) Notice: Subject to any disclaimer, the term of this patent is extended or adjusted under 35 U.S.C. 154(b) by 402 days.

(21) Appl. No.: 10/834,893

(22) Filed: Apr. 30, 2004

(65) Prior Publication Data

US 2005/0026585 A1  Feb. 3, 2005

(30) Foreign Application Priority Data

May 19, 2003 (JP) ............................. 20003-140817

(51) Int. Cl.
*H04B 7/00* (2006.01)
*H04B 1/06* (2006.01)

(52) U.S. Cl. .................... 455/277.1; 455/269; 455/272

(58) Field of Classification Search ............ 455/277.1, 455/277.2, 278.1, 279.2, 130, 140, 269, 272, 455/561, 562.1, 506, 65; 375/346, 347
See application file for complete search history.

(56) References Cited

U.S. PATENT DOCUMENTS

| | | | | |
|---|---|---|---|---|
| 4,742,563 A * | 5/1988 | Fukumura | .................... | 455/132 |
| 5,446,922 A * | 8/1995 | Siwiak et al. | ............. | 455/277.2 |
| 5,499,397 A * | 3/1996 | Wadin et al. | ............. | 455/277.1 |
| 5,603,107 A * | 2/1997 | Gottfried et al. | ........... | 455/133 |
| 5,799,042 A * | 8/1998 | Xiao | .......................... | 375/285 |
| 5,970,061 A * | 10/1999 | Kokudo | ....................... | 370/344 |
| 6,317,424 B1 * | 11/2001 | Euscher | ....................... | 370/350 |
| 6,415,141 B1 * | 7/2002 | Kakura et al. | ............ | 455/277.1 |
| 6,871,054 B2 * | 3/2005 | Kenkel et al. | ........... | 455/277.1 |
| 2004/0170219 A1 * | 9/2004 | Sasaki et al. | ................ | 375/148 |
| 2005/0078649 A1 * | 4/2005 | Tehrani et al. | ............... | 370/343 |
| 2005/0123083 A1 * | 6/2005 | Kawakami | ................... | 375/347 |

FOREIGN PATENT DOCUMENTS

| | | |
|---|---|---|
| JP | 61-069225 | 4/1986 |
| JP | 2003-11056 | 11/2003 |

* cited by examiner

*Primary Examiner*—Sonny Trinh
(74) *Attorney, Agent, or Firm*—Oblon, Spivak, McClelland, Maier & Neustadt, P.C.

(57) ABSTRACT

A receiving apparatus which appropriately selects one out of a plurality of antennae for reception. The receiving apparatus is provided with a reception means for receiving a radio wave via an antenna selected out of the plurality of antennae by a selection means, a reception level signal creation means for creating a reception level signal indicative of reception electric field strength for the received radio wave, an extraction means for eliminating the basic wave components of the radio wave from the reception level signal to create the multiple propagating components of the radio wave in the reception level signal as a multiple propagating wave strength signal, and a reception level signal correction means for correcting the reception level signal by using the multiple propagating wave strength signal to create a corrected reception level signal without the multiple propagating wave components. The antenna selection means obtains the corrected reception level signal for the antennae by selecting the antennae in order in response to a reception start of the reception means, and selects an antenna with the corrected reception level signal of the highest signal level.

3 Claims, 4 Drawing Sheets

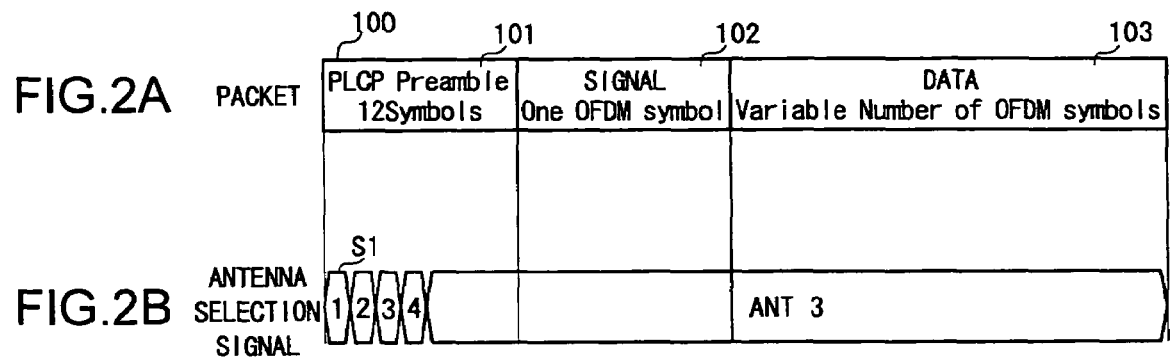
FIG.2A
FIG.2B
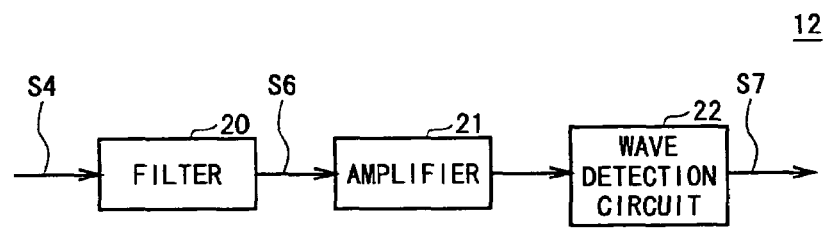
FIG.4

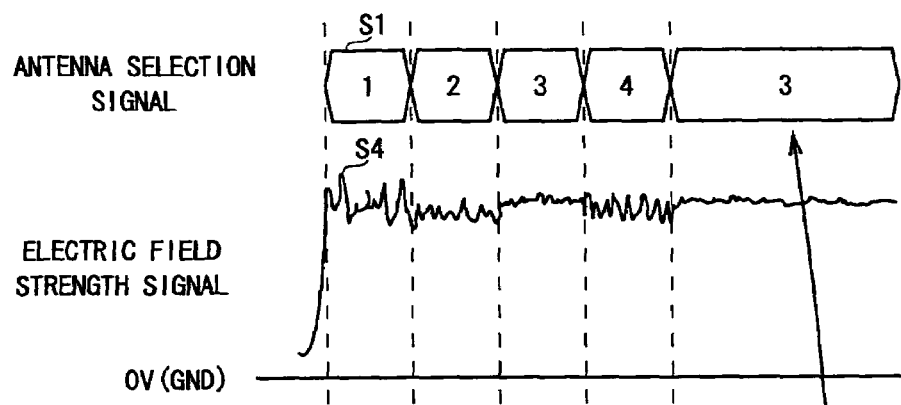
FIG.3A
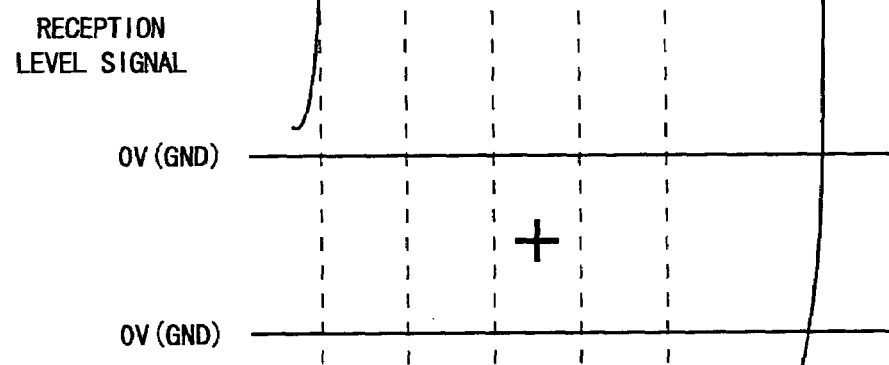
FIG.3B
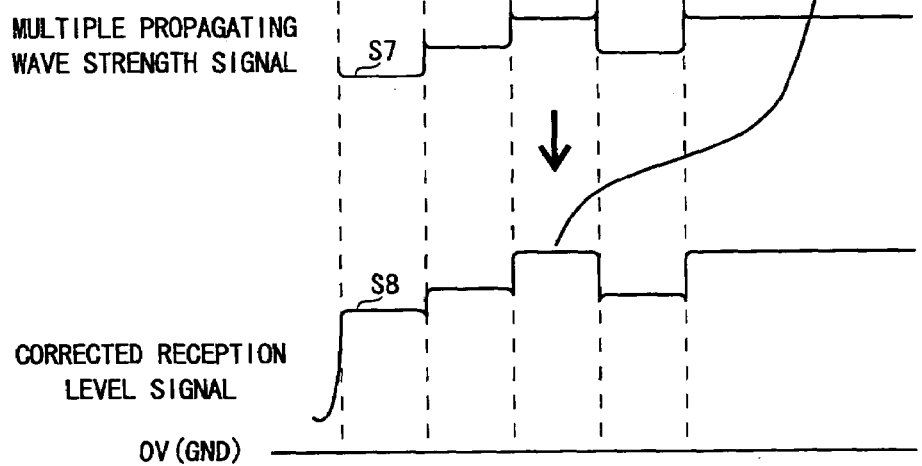
FIG.3C
FIG.3D

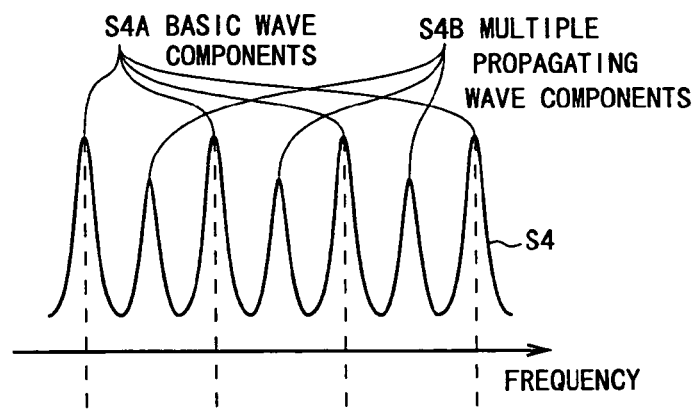
FIG.5A RECEPTION ELECTRIC FIELD SIGNAL
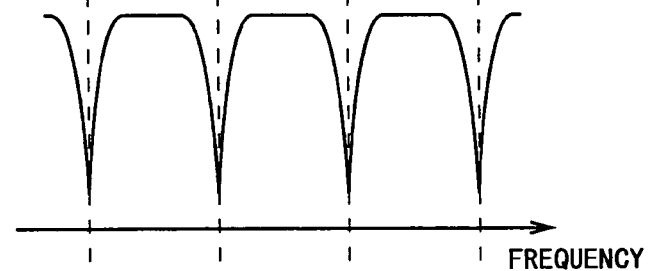
FIG.5B FILTER CHARACTERISTICS
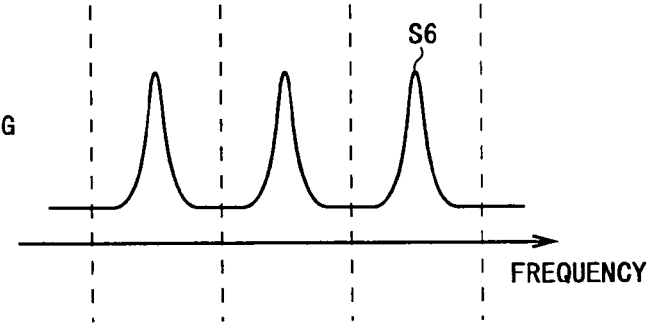
FIG.5C MULTIPLE PROPAGATING WAVE ELECTRIC FIELD SIGNAL

RECEIVING APPARATUS

BACKGROUND OF THE INVENTION

1. Field of the Invention

The present invention relates to a receiving apparatus, and more particularly, is suitably applied to a receiving apparatus with a diversity technique in which a plurality of antennae is switched for reception.

2. Description of the Related Art

Although recent digital radio transmission systems such as wireless local area network (LAN) systems realize higher transmission rates, they have a multipath (multiple propagation) fading problem.

Fading is a phenomenon in which a transmission wave cannot be recovered correctly due to a received distorted composite wave. This occurs because when a receiving device receives a direct wave which is a transmission wave directly coming from a transmission device and multiple propagating waves such as reflected waves generated by reflecting the transmission wave by obstacles, the direct wave and the multiple propagating waves have different phases due to different propagation time.

As a method of reducing the multipath effects, an antenna diversity method have been widely used, in which a plurality of antennae is spatially provided at different positions and an antenna with good reception quality is selected and used (for example, refer to Japanese Patent Laid-Open NO. 2001-148646).

In the antenna diversity method, the reception electric field strength of each antenna is obtained and an antenna with the highest reception electric field strength is selected and used. In the conventional antenna diversity method, however, an antenna having the highest reception electric field strength is selected and used simply, so that an inappropriate antenna may be selected if correct electric field strength cannot be obtained due to multiple propagating waves.

Further, since an antenna should be selected based on reception electric field strength suitable for a preamble part which is a training signal in a transmission wave composed of the preamble part and a data part for transmitting successive information, the antenna diversity method is required to select an appropriate antenna immediately.

SUMMARY OF THE INVENTION

In view of the foregoing, an object of this invention is to provide a receiving apparatus capable of selecting an appropriate antenna immediately for reception.

The foregoing object and other objects of the invention have been achieved by the provision of a receiving apparatus comprising: a plurality of antennae; an antenna selection means for selecting one antenna out of the plurality of antennae; a reception means for receiving a prescribed radio wave via the antenna selected by the selecting means; a reception level signal creation means for creating a reception level signal indicative of the reception electric field strength for the radio wave received via the antenna selected by the selecting means; an extraction means for extracting multiple propagating wave components from the reception level signal as a multiple propagating wave strength signal; and a reception level signal correction means for correcting the reception level signal by using the multiple propagating wave strength signal to create a corrected reception level signal without the multiple propagating wave components.

The antenna selection means selects the antennae in order when the reception means starts to receive the radio wave, to obtain the corrected reception level signal for the antennae, and selects an antenna with the corrected reception level signal of the highest signal level.

The multiple propagating wave components of the radio wave in the reception level signal are extracted as the multiple propagating wave strength signal and the reception level signal is corrected by using the multiple propagating wave strength signal, thus obtaining the corrected reception level signal without the multiple propagating wave components. Since an antenna is selected by using the corrected reception level signal, an appropriate antenna can be selected, which provides high electric field strength and is capable of receiving the wave which is not affected much by multiple propagation.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A and 2B are schematic diagrams showing a frame format and an antenna selection signal;

FIG. 3A to 3D are characteristic curves showing wave forms of a reception level signal;

FIG. 4 is a block diagram showing a construction of a multiple propagating wave detection circuit; and FIGS. 5A to 5C are characteristic curves showing frequency characteristics of reception electric field strength and filter.

DETAILED DESCRIPTION OF THE EMBODIMENT

Figure 1:
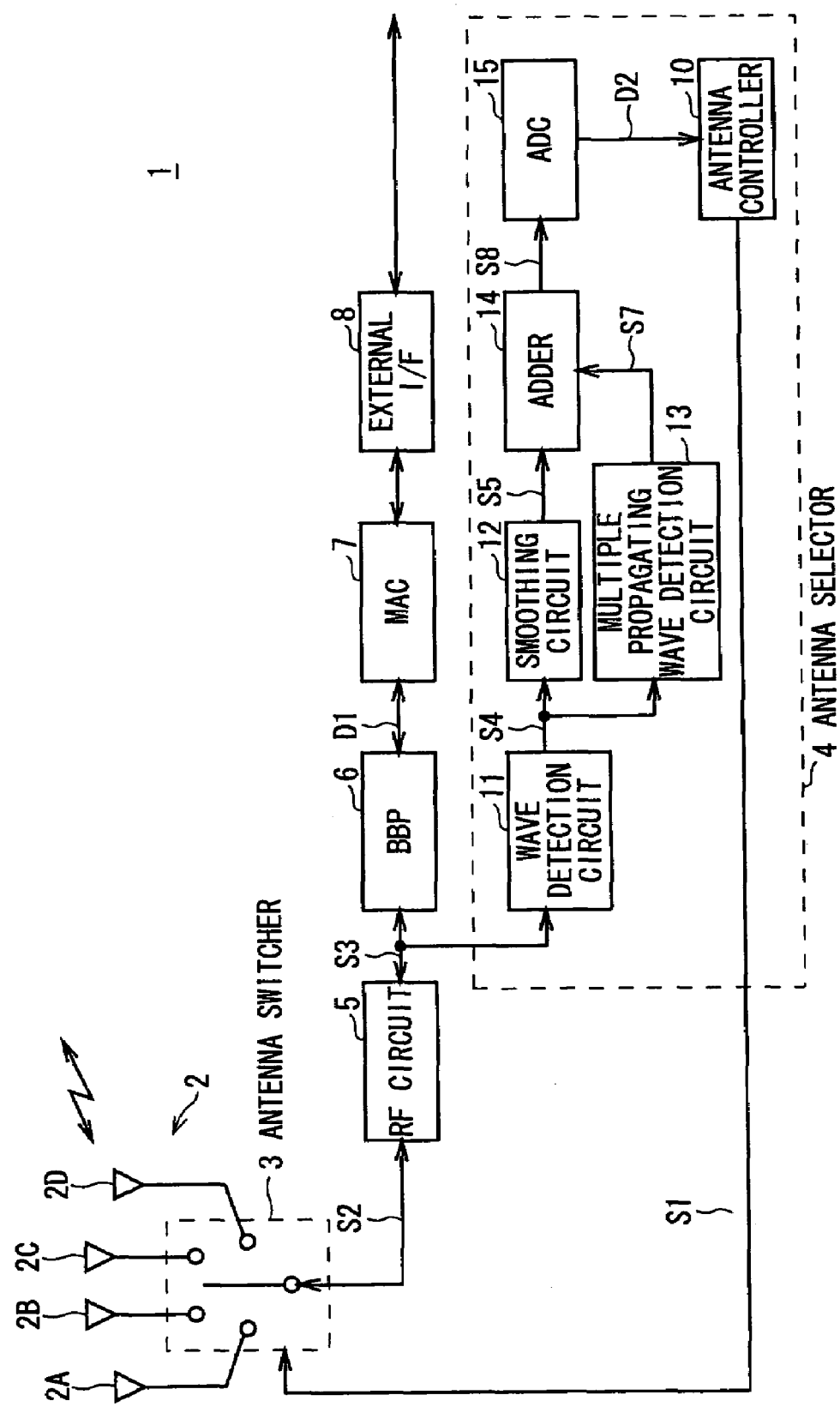
FIG. 1 is a block diagram showing a constriction of a wireless LAN terminal according to the present invention.

Preferred embodiments of this invention will be described with reference to the accompanying drawings:

(1) Entire Construction of Wireless LAN Terminal

Referring to FIG. 1, reference numeral 1 shows a wireless LAN terminal to which this invention is applied. This wireless LAN terminal 1 receives orthogonal frequency division multiplexing (OFDM) signals based on the Institute of Electrical and Electronics Engineers (IEEE) 802.11a standards from other wireless LAN terminals and access points.

Specifically, the wireless LAN terminal 1 is provided with four non-directional antennae 2 (first, second, third and fourth antennae 2A to 2D) at spatially different positions. An antenna switcher 3 serving as an antenna selection means selects one out of the antennae 2A to 2D in response to a switching control signal S1 received from an antenna control circuit 10 of an antenna selector 4, and connects the antenna to a radio frequency (RF) circuit 5 of the latter stage. The RF circuit 5 serving as a reception means amplifies and frequency-converts a packet of the OFDM signal S2 received via the selected antenna to create a baseband signal S3, and sends this to a baseband processor 6 and the antenna selector 4.

FIG. 2A shows the frame format 100 of a packet based on the IEEE80.211a standards. This format 100 is composed of a preamble 101 which is a training signal indicating the beginning of the signal, a signal part 102 including header information such as a transmission rate and packet length, and a data part 103 storing data to be transmitted. After the baseband processor 6 establishes synchronization with the packet by using the preamble 101 of the baseband signal S3, it creates reception data D1 by performing OFDM demodulation on the baseband signal S3 and gives the data D1 to a media access control (MAC) unit 7.

The MAC unit 7 packetizes the reception data D1 based on a prescribed frame format and outputs the resultant to an information processing apparatus (not shown) such as a personal computer via an external interface 8.

In addition, the MAC unit 7 packetizes transmission data received from an information processing apparatus via the external interface 8 and gives the resultant to the baseband processor 6. The baseband processor 6 creates an OFDM signal by applying OFDM modulation to the transmission data. Then the RF circuit 5 amplifies and frequency-converts this signal and sends the resultant to a wireless LAN terminal via the antenna 2.

(2) Antenna Selection by Antenna Selector

In addition to the above configuration, in the wireless LAN terminal 1, by receiving the preamble 101 in a packet of an OFDM signal while selecting the four antennae 4A to 4D in order, the reception electric field strengths of the antennae are compared with each other. Then the packet is received via an antenna with the highest reception electric field strength.

That is, the antenna control circuit 10 serving as the antenna selection means selects the antennae 2A to 2D in order by switching the antenna selection signal S1 in synchronization with the reception start timing of the preamble 101 of the packet, as shown in FIG. 2B. This antenna selection is performed within a half of the preamble 101 or shorter.

A wave detection circuit 11 serving as a reception level signal creation means detects a baseband signal S3 sent from the RF circuit 5, and creates a reception electric field strength signal S4 indicating the reception electric field strengths of the antennae 2A to 2D synchronizing with the antenna selection signal S1 as shown in FIG. 3A, and gives this to a smoothing circuit 12 and a multiple propagating wave detection circuit 13.

The smoothing circuit 12 serving as a reception level signal creation means smoothes the reception electric field strength signal S4 to create a reception level signal S5 comprising a plus direct current level signal as shown in FIG. 3B, and gives this signal S5 to an adder 14. The plus direct current level signal has a higher voltage level as a reception electric field strength is higher.

The multiple propagating wave detection circuit 13 inputs the reception electric field strength signal S4 to a filter 20 (FIG. 4). FIG. 5A shows an example of frequency characteristics of the reception electric field strength signal S4. Multiple propagating wave components S4B appear between basic wave components S4A of the OFDM signal which appear at predetermined intervals.

The filter 20 serving as an extraction is a notch filter with filtering characteristics (FIG. 5B) to prevent this basic wave components S4A. The filter 20 creates a multiple propagating wave electric field strength signal S6 including only multiple propagating wave components as shown in FIG. 5C by eliminating the basic wave components S4A form the reception electric field strength signal S4, and gives this signal S6 to an amplifier 21 of the latter stage.

The amplifier 21 amplifies the multiple propagating wave electric field strength signal S6 attenuated through the filter 20, and inputs the resultant to the wave detection circuit 22. The wave detection circuit 22 serving as the extraction means performs minus detection of the multiple propagating wave electric field strength signal S6 to create a multiple propagating wave strength signal S7 comprising a minus direct current level signal as shown in FIG. 3C, and then gives this to the adder 14. The minus direct current level signal has a lower voltage level as electric field strength for the multiple propagating wave is higher.

The adder 14 serving as a reception level signal correction means adds the multiple propagating wave strength signal S7 comprising the minus direct current level signal to the reception level signal S5 comprising plus direct current level signal, to create a corrected reception level signal S8 (FIG. 3D) which is the reception level signal S5 without the effects of the multiple propagating waves.

Then in the antenna selector 4 serving as the antenna selection means, an analog-to-digital converter 15 converts the corrected reception level signal S8 to a digital signal and gives the resultant to the antenna control circuit 10. The antenna control circuit 10 controls the antenna switcher 3 based on the corrected reception level signal S8 so as to select an antenna with the highest reception strength.

After selecting an appropriate antenna as described above, the wireless LAN terminal 1 establishes synchronization by using the parts other than the preamble 101 to demodulate the latter part of the packet.

For example, the reception level signal S5 shown in FIG. 3B indicates that the first antenna and the third antenna have almost the same reception strength. The multiple propagating wave strength signal S7 shown in FIG. 3C, however, indicates that the first antenna has a higher reception level for the multiple propagating waves and the third antenna has a lower reception level for the multiple propagating waves. Therefore, as to the corrected reception level signal S8 without the effects of the multiple propagating waves, the third antenna has the highest reception level. As a result, selecting the third antenna-means that the parts after the preamble of the packet can be received and modulated via the most appropriate antenna. The antenna selector 4 executes the above antenna selection every time when receiving a new packet.

In the antenna selector 4, only the analog-to-digital converter 15 and the antenna control circuit 10 are digital circuits. The other wave detection circuit 11, smoothing circuit 12, multiple propagating wave detection circuit 13 and adder 14 are analog circuits. Therefore, this antenna selector 4 is constructed simpler, as compared with a case of constructing an analog selector with all digital circuits. In addition, digital operations which relatively take processing time can be minimized, resulting in performing the antenna selection in a short time to select an antenna at a high speed.

(3) Operation and Effects

According to the above configuration, the antenna selector 4 of the wireless LAN terminal 1 receives a preamble part which is the beginning of a packet while selecting the antennae 2A to 2D in order, and creates the reception electric field strength signal S4 indicative of the reception electric field strengths of the antennae 2A to 2D.

Then the antenna selector 4 smoothes the reception electric field strength signal S4 to create the reception level signal S5 comprising a plus direct current level signal indicative of the reception electric field strengths for both the basic wave and multiple propagating waves. At the same time, the antenna selector 4 eliminates basic wave components from the reception electric field strength signal S4 through the filter 20 and then performs the minus wave detection with the wave detection circuit 22 to create the multiple propagating wave strength signal S7 which comprises a minus direct current level signal and indicates the strength of the multiple propagating wave components.

Further, the antenna selector 4 adds the multiple propagating wave strength signal S7 to the reception level signal S5 to create the corrected reception level signal S8 which is the reception level signal S5 without the effects of the multiple propagating wave components.

Then the antenna selector 4 selects an antenna having the highest reception level based on the corrected reception level signal S8 and receives the parts after the preamble of the packet via the selected antenna.

According to the above configuration, since an antenna is selected based on the corrected reception level signal S8 without the multiple propagating wave components, an appropriate antenna can be selected which has high reception level and is able to receive the wave which is not affected much by multiple propagation, with high reception quality. In addition, since the antenna selection can be executed by mainly analog circuits, an antenna can be selected immediately with a simple construction.

(4) Other Embodiments

In the above described embodiment, a plurality of non-directional antennae are provided to select an appropriate antenna based on the corrected reception level signal S8. This invention, however, is not limited to this and can be applied to a case where an antenna which can select a plurality of directions is used and an appropriate direction can be selected based on the corrected reception level signal S8.

Further, in the above described embodiment, the four antennae 2A to 2D are provided in the wireless LAN terminal 1 and the four antennae 2A to 2D are switched and used. This invention, however, is not limited to this and can be applied to a case where, in short, a plurality of antennae are provided.

Furthermore, in the above described embodiment, the wave detection circuit 22 performs the minus detection of the multiple propagating wave electric field strength signal S6 in which the basic wave components S4A have been eliminated by the filter 20, to create the multiple propagating wave strength signal S7 comprising minus direct current level signal. And the signal S7 is added to the reception level signal S5 comprising a plus direct current level signal to create the corrected reception level signal S8 without the multiple propagating wave components. This invention, however, is not limited to this and a multiple propagating wave strength signal comprising a plus direct current level signal can be created by performing the plus detection of the multiple propagating wave electric field strength signal S6, and a corrected reception level signal can be created by subtracting this signal from the reception level signal, provided that the corrected reception level signal can be created by eliminating multiple propagating wave components from the reception level signal.

Furthermore, in the above described embodiment, the wave detection circuit 11 detects the baseband signal S3 which is output from the RF circuit 5 to create the reception electric field strength signal S4. This invention, however, is not limited to this and the RF circuit 5 frequency-converts the received OFDM signal S2 to create an intermediate frequency signal and the wave detection circuit 11 can create the reception electric field strength signal S4 by detecting the intermediate frequency signal.

Furthermore, in the above described embodiment, an antenna to be used for reception is selected based on the corrected reception level signal S8. This invention, however, is not limited to this and an antenna to be used for transmission can be selected based on the corrected reception level signal S8.

Furthermore, in the above described embodiment, this invention is applied to the wireless LAN terminal based on the IEEE802.11a standards. This invention, however, is not limited to this and can be applied to various communication apparatuses with a reception function, such as access points of wireless LAN systems, base stations and portable telephones of portable telephone systems and receiving units for terrestrial television.

According to this invention, multiple propagating wave components of a radio wave in a reception level signal is extracted as a multiple propagating wave strength signal, and the reception level signal is corrected based on the multiple propagating wave strength signal, thereby obtaining a corrected reception level signal without the multiple propagating wave components. Then an antenna is selected based on the corrected reception level signal. Therefore, even if electric field strength for multiple propagating waves is high, an appropriate antenna can be selected which has high electric field strength and can receive a wave that is not affected much by multiple propagation.

While there has been described in connection with the preferred embodiments of the invention, it will be obvious to those skilled in the art that various changed and modifications may be aimed, therefore, to cover in the appended claims all such changes and modifications as fall within the true spirit ad scope of the invention.

What is claimed is:

1. A receiving apparatus comprising:
a plurality of antennae;
antenna selection means for selecting one antenna out of the plurality of antennae;
reception means for receiving a prescribed radio wave via said antenna selected by said antenna selection means;
reception level signal creation means for creating a reception level signal indicating reception electric field strength for said radio wave received by said antenna selected by said selection means;
extraction means for extracting multiple propagating wave components of said radio wave in said reception level signal as a multiple propagating wave strength signal; and
reception level signal correction means for correcting said reception level signal by using said multiple propagating wave strength signal to create a corrected reception level signal without said multiple propagating wave components, wherein
said antenna selection means obtains said corrected reception level signal for said plurality of antennae by selecting the plurality of antennae in order in response to reception start of said radio wave by said reception means, and selects an antenna with the corrected reception level signal of a highest signal level.

2. The receiving apparatus according to claim 1, wherein:

said extraction means eliminates basic wave components of said radio wave from said reception level signal and then performs minus detection to create said multiple propagating wave strength signal comprising a minus direct current level signal; and said reception level signal correction means adds said multiple propagating wave strength signal comprising the minus direct current level signal to said reception level signal comprising a plus direct current level signal to create said corrected reception level signal.

3. The receiving apparatus according to claim 1, wherein said antenna selection means obtains the corrected reception level signal by selecting said plurality of antennae in order in a preamble part of said radio wave received, and selects an antenna with the corrected reception level signal of a highest signal level to make the reception means receive said radio wave.

\* \* \* \* \*